(12) United States Patent
Simpson

(10) Patent No.: US 6,460,616 B1
(45) Date of Patent: *Oct. 8, 2002

(54) TRACTION APPARATUS

(75) Inventor: Neil Andrew Abercrombie Simpson, Aberdeen (GB)

(73) Assignee: Weatherford/Lamb, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,423

(22) PCT Filed: Aug. 15, 1997

(86) PCT No.: PCT/GB97/02188

§ 371 (c)(1),
(2), (4) Date: Feb. 16, 1999

(87) PCT Pub. No.: WO99/06927

PCT Pub. Date: Feb. 19, 1998

(30) Foreign Application Priority Data

Aug. 15, 1996 (GB) .............................................. 9617115

(51) Int. Cl.⁷ .............................................. E21B 33/08
(52) U.S. Cl. .................... 166/104; 166/66.4; 166/177.3; 166/173
(58) Field of Search ................................ 166/104, 65.1, 166/66.4, 177.3, 243, 173; 175/99, 98

(56) References Cited

U.S. PATENT DOCUMENTS

| | | | |
|---|---|---|---|
| 2,518,330 A | 8/1950 | Jasper et al. ................. | 175/377 |
| 3,047,270 A | 7/1962 | Moore, Jr. ............... | 254/134.6 |
| 3,144,240 A | 8/1964 | Connell | |
| 4,031,750 A | 6/1977 | Youmans et al. ............. | 73/151 |
| 4,071,086 A | 1/1978 | Bennett ....................... | 166/177 |
| 4,192,380 A | 3/1980 | Smith .......................... | 166/250 |

(List continued on next page.)

FOREIGN PATENT DOCUMENTS

| | | | |
|---|---|---|---|
| DE | 24 05 343 | 8/1975 | ............ B63H/1/32 |
| DE | 33 11 094 A1 | 9/1984 | |
| EP | 0 390 352 | 10/1990 | ......... G21C/17/017 |
| EP | 0 514 039 | 11/1992 | ........... F16L/55/26 |
| EP | 0 523 880 | 1/1993 | ............. F17D/5/02 |
| EP | 0 526 900 | 2/1993 | ........... F16L/55/26 |
| FR | 2 355 236 | 1/1978 | ........... F16L/55/00 |
| FR | 2 495 191 | 6/1982 | ........... C23F/13/00 |
| GB | 614 592 | 12/1948 | |
| GB | 1 124 732 | 8/1968 | ............. B08B/9/02 |
| GB | 1 418 492 | 12/1975 | ........... B62D/57/02 |
| GB | 93 11 145.2 | 1/1995 | ............. F16L/5/02 |
| GB | 2 331 347 | 5/1999 | ........... B26D/57/00 |
| GB | 2 305 407 | 9/1999 | ........... B26D/57/02 |
| WO | WO 86/01751 | 3/1986 | ............. B08B/9/04 |
| WO | WO 93/24728 | 12/1993 | ........... E21B/17/10 |
| WO | 94/08728 | 4/1994 | |
| WO | WO 99/36724 | 7/1999 | ........... F16L/55/28 |

*Primary Examiner*—David Bagnell
*Assistant Examiner*—Zakiya Walker
(74) *Attorney, Agent, or Firm*—Moser, Patterson & Sheridan, L.L.P.

(57) ABSTRACT

A traction apparatus (1A) includes at least one traction member (51) when engages a surface (10A) against which traction is to be provided. The traction member can move relatively freely in one direction over the surface but has high resistance to movement in the other direction. The apparatus can be made to move by having a number of traction members (51–56) which move or oscillate relative to each other. There are preferably a large number of traction members which are in the forms of bristles in a brushlike part of the apparatus. The apparatus is suitable for use in down-hole tools. The bristles are bent in a first direction by being constrained in a hole facilitating movement in the opposite direction but preventing movement in the first direction.

34 Claims, 9 Drawing Sheets

U.S. PATENT DOCUMENTS

| | | | |
|---|---|---|---|
| 4,389,208 A | 6/1983 | LeVeen et al. | 604/95 |
| 4,460,920 A | 7/1984 | Weber et al. | 358/100 |
| 4,537,136 A | 8/1985 | Douglas | 104/138 G |
| 4,581,938 A | 4/1986 | Wentzell | 73/623 |
| 4,676,310 A | 6/1987 | Scherbatskoy et al. | 166/65.1 |
| 4,919,223 A | 4/1990 | Egger et al. | 180/8.1 |
| 5,121,694 A | 6/1992 | Zollinger | 104/138.2 |
| 5,184,676 A * | 2/1993 | Graham et al. | 166/66.4 |
| 5,625,917 A | 5/1997 | Hawkins | 15/104.061 |
| 5,794,703 A | 8/1998 | Newman et al. | 166/381 |
| 6,082,461 A | 7/2000 | Newman et al. | 166/381 |
| 6,089,323 A | 7/2000 | Newman et al. | 166/381 |

* cited by examiner

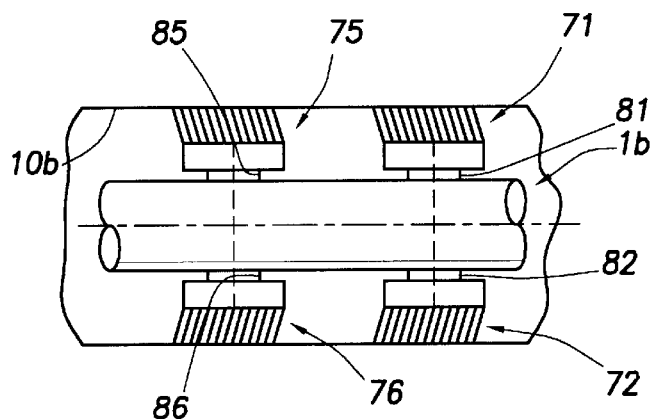
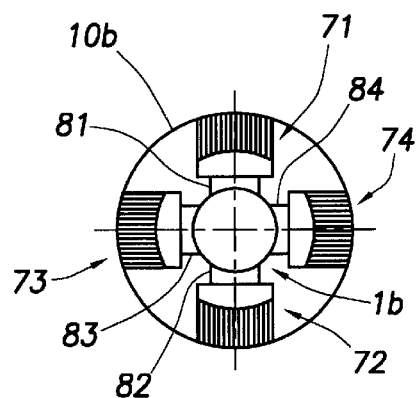
FIG.5a
FIG.5b
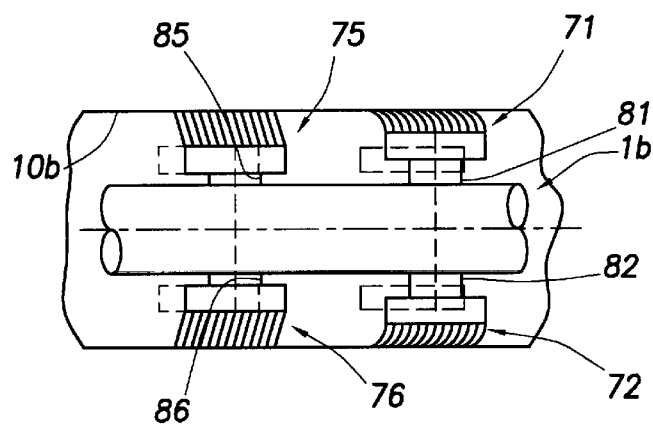
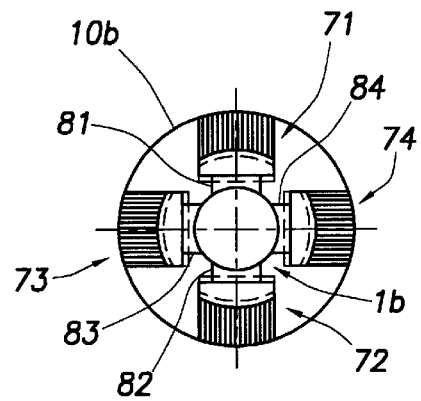
FIG.6a
FIG.6b
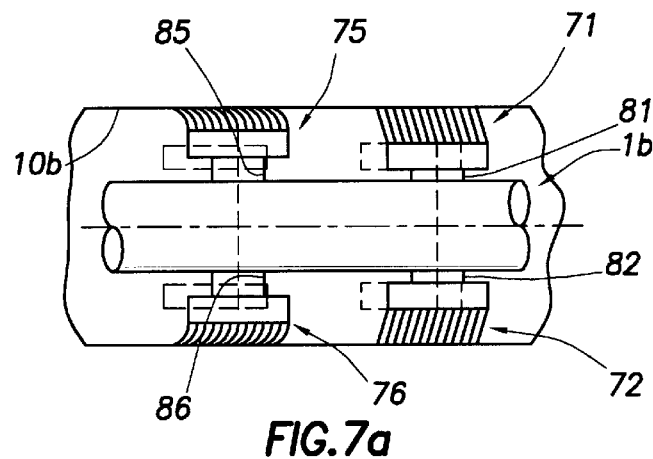
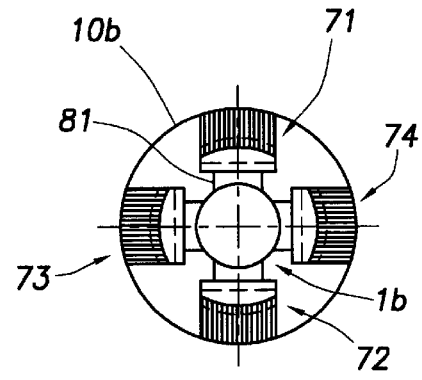
FIG.7a
FIG.7b

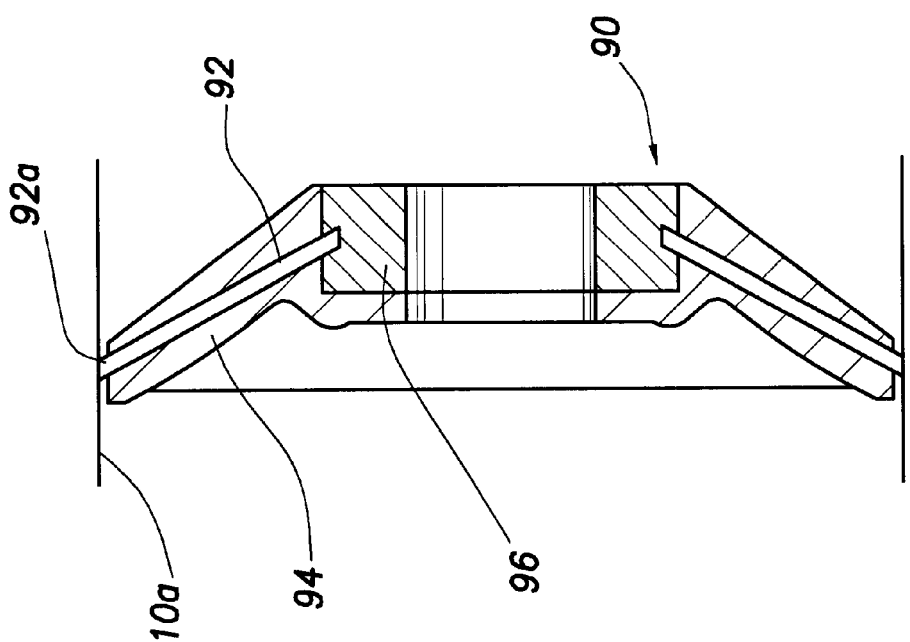
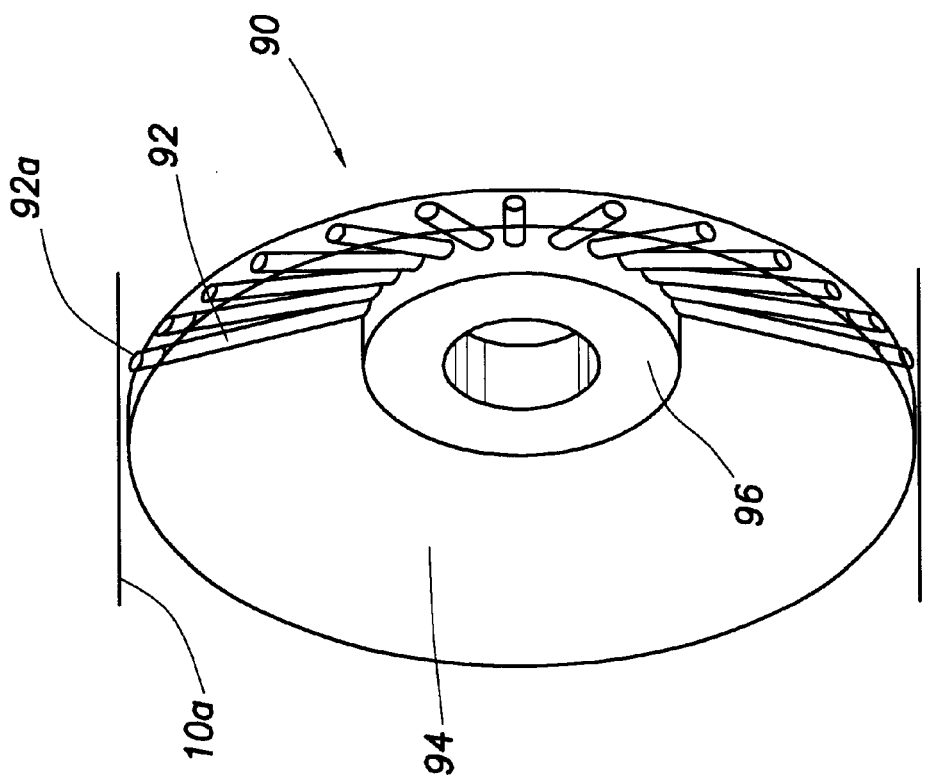

TRACTION APPARATUS

This invention relates to a traction apparatus and especially but not exclusively to a traction apparatus for use in a down hole tool which is adapted for operation in horizontal wells or bores.

Within the oil and petroleum industry there is a requirement to deploy and operate equipment along bores in open formation hole, steel cased hole and through tubular members such as marine risers and sub-sea pipelines. In predominately vertical sections of well bores and risers this is usually achieved by using smaller diameter tubular members such as drill pipe, jointed tubing or coiled tubing as a string on which to hang the equipment. In many cases the use of steel cable (wire line), with or without electric conductors installed within it, is also common. All of these approaches rely on gravity to provide a force which assists in deploying the equipment.

In the case of marine pipe lines which are generally horizontal, "pigs" which are basically pistons sealing against the pipe wall, are used to deploy and operate cleaning and inspection equipment, by hydraulically pumping them along the pipe, normally in one direction.

Within the oil and petroleum industry to date the requirement to deploy equipment has been fulfilled in these ways.

However, as oil and gas reserves become scarcer or depleted, methods for more efficient production are being developed.

In recent years horizontal drilling has proved to enhance greatly the rate of production from wells producing in tight or depleted formation. Tight formations typically are hydrocarbon-bearing formations with poor permeability, such as the Austin Chalk in the United Stated and the Danian chalk in the Danish Sector of the North Sea.

In these tight formations oil production rates have dropped rapidly when conventional wells have been drilled. This is due to the small section of producing formation open to the well bore.

However when the well bore has been drilled horizontally through the oil producing zones, the producing section of the hole is greatly extended resulting in dramatic increases in production. This has also proved to be effective in depleted formations which have been produced for some years and have dropped in production output.

However, horizontal drilling has many inherent difficulties, a major one being that the forces of gravity are no longer working in favour of deploying and operating equipment within these long horizontal bores.

This basic change in well geometry has led to operations which normally could have been carried on wire line in a cost effective way now being carried out by the use of stiff tubulars to deploy equipment, for example drill pipe and tubing conveyed logs which cost significantly more than wire-line deployed logs.

Sub-sea and surface pipeline are also increasing in length and complexity and pig technology does not fully satisfy current and future needs. There is currently a need for a traction apparatus which can be used effectively in down-hole applications including horizontal bores.

According to the present invention there is provided traction apparatus comprising: a body from which body extends at least one traction member wherein said at least one traction member is adapted to be urged against a traction surface against which traction is to be obtained, and wherein when said at least one traction member is urged against such a surface it is adapted to move relatively freely in one direction with respect to said surface, but substantially less freely in the opposite direction.

Preferably, said at least one traction member is formed from a resilient material.

Preferably, said at least one traction member includes an end portion for contact with a traction surface.

Preferably, said body is elongate and said at least one traction member is adapted to be inclined so that it extends in a first axial direction of the body as it extends between the body and a traction surface.

Preferably, the direction in which the traction member is adapted to move preferentially is substantially opposed to the first axial direction of the body.

Preferably, the system is for use in a bore and the traction surface comprises the inner wall of the bore.

Preferably, there is provided means to move the at least some portion of one or more of at least one traction members with respect to the traction surface.

Preferably, said motion of the one or more traction members allows propulsion of the body with respect to the traction surface.

Preferably, said propulsion is substantially in the direction in which the traction member moves preferentially with respect to the traction surface.

Preferably, the motion of the one or more traction members is provided by applying a force with a component substantially parallel to the direction of preferential movement of the at least one traction member.

Preferably, the motion of the one or more traction members is provided by applying a force with a component substantially perpendicular to the direction of preferential movement of the at least one traction member.

Motion may be provided to the one or more traction members by connection to a rotary member having a first axis, which rotates about a second axis which is not coincident with said first axis.

Preferably, said means to move the at least one traction member comprises means to oscillate said at least one traction member.

Preferably, there are provided a plurality of traction members in close proximity to each other, to form a discrete area of traction members.

Preferably, at least two of the traction members in said discrete area are encapsulated together in a matrix of resilient material.

Preferably, there are provided a number of spaced apart, discrete areas of traction members.

Preferably, at least two discrete areas of traction members are moved relative to each other.

Embodiments of the invention will now be described by way of example, with reference to accompanying drawings in which:

FIGS. 5a, 6a and 7a are schematic illustrations showing side views of the sequential positions of elements in a further embodiment of the present invention in use;

FIGS. 5b, 6b and 7b are schematic end views corresponding to FIGS. 5a, 6a and 7a, respectively;

FIGS. 9a and 9b show, respectively, a perspective view and a cross sectional view of an embodiment of a pig which includes traction members.

Figure 1:
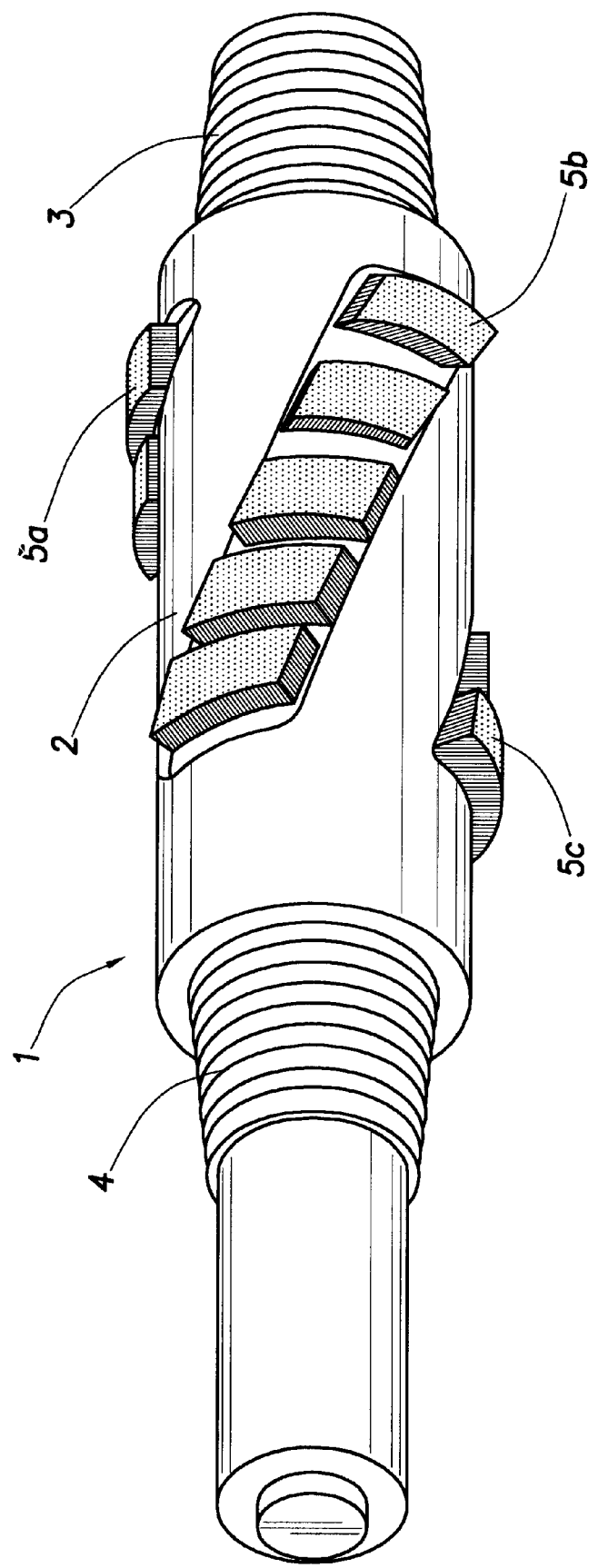
FIG. 1 shows an embodiment of traction apparatus in accordance with the present invention incorporated into a down-hole tool.

FIG. 1 shows an embodiment of traction apparatus incorporated into a down-hole tool 1. The down-hole tool comprises a body 2 which is elongate and which has a threaded front end portion 3 and a threaded rear end portion 4 to allow attachment into a tool string. (It should be appreciated that the terms "front end" and "rear end" are used for convenience only and should not be considered limiting. Terms such as "in front" and "rearwards", which will be used hereafter, are to be understood accordingly.)

The tool body is provided with brush portions of which three, designated 5a, 5b and 5c are shown. Each brush portion 5a, 5b and 5c includes a number of brush sections and each brush section includes a large number of resilient bristles which in this embodiment comprise traction members, and which extend outwardly from the body 2. The bristles thus have inner ends attached to the body and outer ends distal from the body.

If the down hole tool 1 is inserted front end first into a bore with a diameter larger than the diameter of the body 2 but slightly smaller than the external diameter formed by the outer ends of the bristles, then the bristles will be bent back, by the contact with the inner wall of the bore, such that the outer ends of the bristles are axially behind the inner ends of the bristles. Under these circumstances the outer ends of the bristles will contact the inner wall of the bore and will offer more resistance to rearward motion of the tool than to forward motion of the tool. The bristles therefore move preferentially in the forward direction as against the rearward direction. Preferred embodiments of the present invention employ the principle behind this phenomenon to allow propulsion of a tool by providing relative movement or oscillation between two or more brush sections (ie two or more groups of bristles constituting traction members).

Figure 2A:
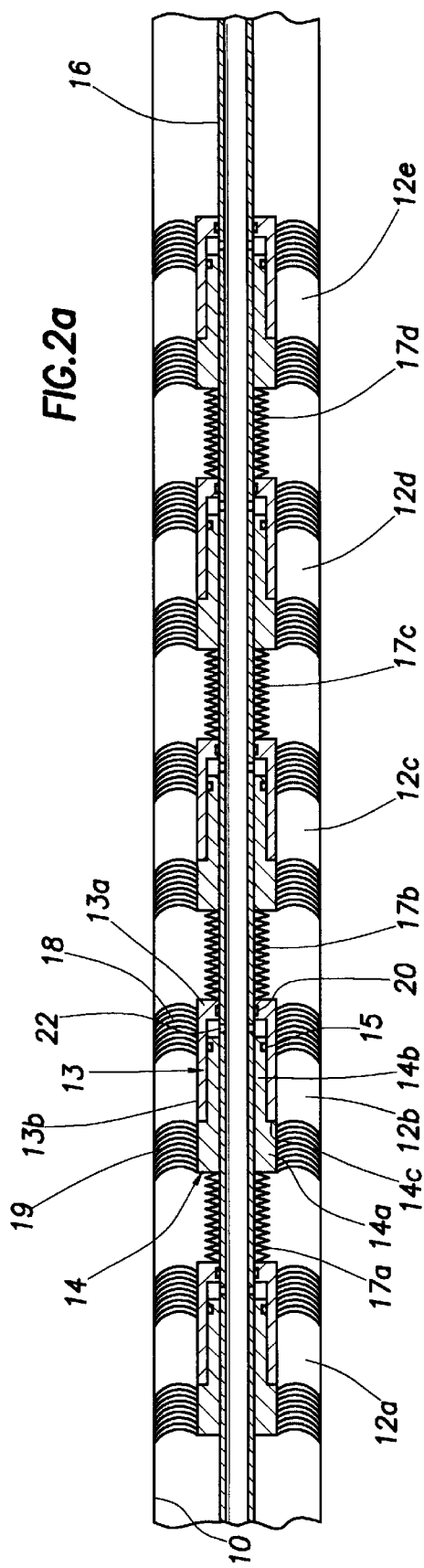
FIG. 2a is a schematic cross sectional view of an alternative embodiment of the present invention, which is hydraulically powered in use.

FIG. 2a shows schematically a preferred embodiment of traction apparatus in accordance with the present invention. The apparatus comprises first to fifth sections 12a to 12e respectively.

The sections 12a to 12e are connected by a pipe 16 which carries hydraulic fluid. First to fourth resilient members 17a to 17d are provided between the first to fifth sections 12a to 12e.

The apparatus, as illustrated in FIG. 2a is provided within a horizontal bore which has an inner wall 10 the surface of which constitutes a traction surface.

The second section 12b of the apparatus will now be described in detail. The outer sections 12a, 12c, 12d, 12e are similar in structure and function and will not be separately described in detail.

The second section 12b includes a front portion 13 provided with a front brush section 18 and a rear portion provided with a rear brush portion 19. The brush portions 18, 19 are formed from resilient bristles which are, in use, deformed by contact with the inner wall 10 so that the outermost end of each bristle is to the rear of the inner most end of the bristle. The bristles thus constitute traction members which are adapted to move preferentially in one direction (to the right as shown in FIG. 2a). The rear portion 14 is fixed around the pipe 16, is co-axial with the pipe 16, and includes a larger diameter part 14a and a smaller diameter part 14b. The smaller diameter part 14b is forward of the larger diameter part 14a. Where the diameter changes between the larger diameter part 14a and the smaller diameter part 14b an abutment shoulder 14c is formed.

The front portion 13 is able to move axially with respect to the pipe 16 and is sealed against the pipe 16 by a sliding seal 20. The front portion is cup shaped having a base part 13a which contacts the pipe 16 and a cylindrical hollow part 13b, extending rearward from the base part 13b, which is radially spaced apart from the pipe 16.

The inner diameter of the hollow part 13b of the front portion 13 is substantially the same as the outer diameter of the smaller diameter part 14b of the rear portion 14. The smaller diameter part 14b fits inside the hollow part 13b and a sliding seal 15 is provided therebetween. As the rear portion 14 is fixed with respect to the pipe 16 and the front portion 13 is able to move axially with respect to the pipe 16, the hollow part 13b is able to move axially with respect to the smaller diameter part 14b so as to cover more or less of the smaller diameter part 14b.

The hollow part 13b has a longer axial length than the smaller diameter part 14b so that when the smaller diameter part 14b is completely covered by the hollow part 13b the rearmost end of the hollow part 13b abuts the abutment shoulder 14c but the forwardmost end of the smaller diameter part 14b does not reach the base part 13a of the front portion 13. A hydraulic fluid space 21 is formed between the base part 13a and the forwardmost end of the smaller diameter part 14b. A hydraulic fluid outlet 22 from the pipe 16 is provided to supply fluid to the hydraulic fluid space 21.

In use, the hydraulic fluid pressure in the pipe 16 is increased to force fluid into the hydraulic fluid space 21. This forces apart the front portion 13 and the rear portion 14. Since the front portion 13 is less resistant to forward motion than the rear portion 14 is to rearward motion (because of the action of the brush portions 18, 19) this results in the front portion 13 being forced forward while the rear portion 14 stays stationary. This results in axial lengthening of the hydraulic fluid space 21 and compression of the second resilient member 17b.

The hydraulic fluid pressure in the pipe 16 is then reduced so that the front portion 13 and the rear portion 14 are forced together by the action of the resilient member 17b, forcing hydraulic fluid from the hydraulic fluid space 21 via the outlet 22 into the pipe. As the front portion 13 and the rear portion 14 are forced together the considerable resistance of the front portion 13 to rearward motion ensures that the front portion remains substantially stationary with respect to the inner wall 10 of the bore, so the rear portion is forced forwards with respect to the inner wall 10.

Figure 2B:
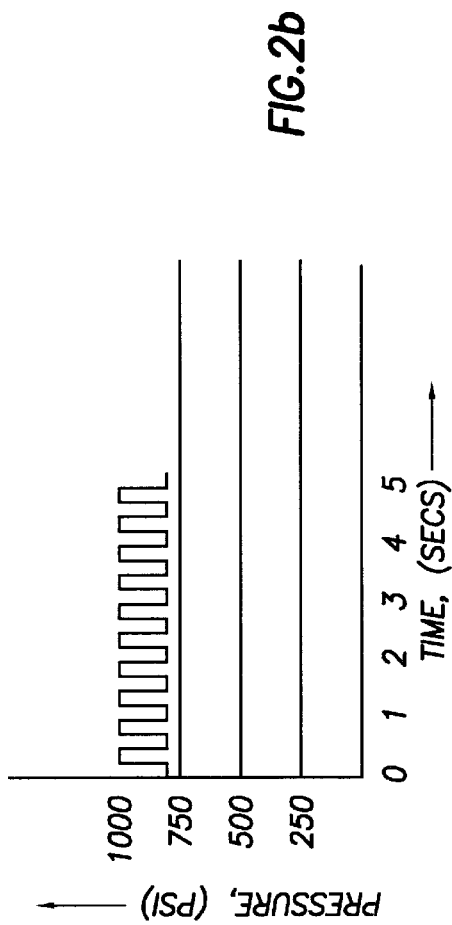
FIG. 2b is a graph showing hydraulic fluid pressure versus time for the embodiment of FIG. 2a in use.

Each cycle of increase and decrease of fluid pressure in the pipe 16 therefore results in the apparatus taking a "step" in the desired direction along the bore. It should, of course, be appreciated that although the above has been described with respect to only one section 12b of the apparatus of FIG. 2a, the other sections 12a, 12c, 12d, 12e respond similarly to increases and decreases in fluid pressure. FIG. 2b shows how fluid pressure may be varied with time in order to obtain movement of the apparatus at a rate of about two steps per second. (One PSI is equal to about $6.9 \times 10^3$ Pa.)

Figure 3:
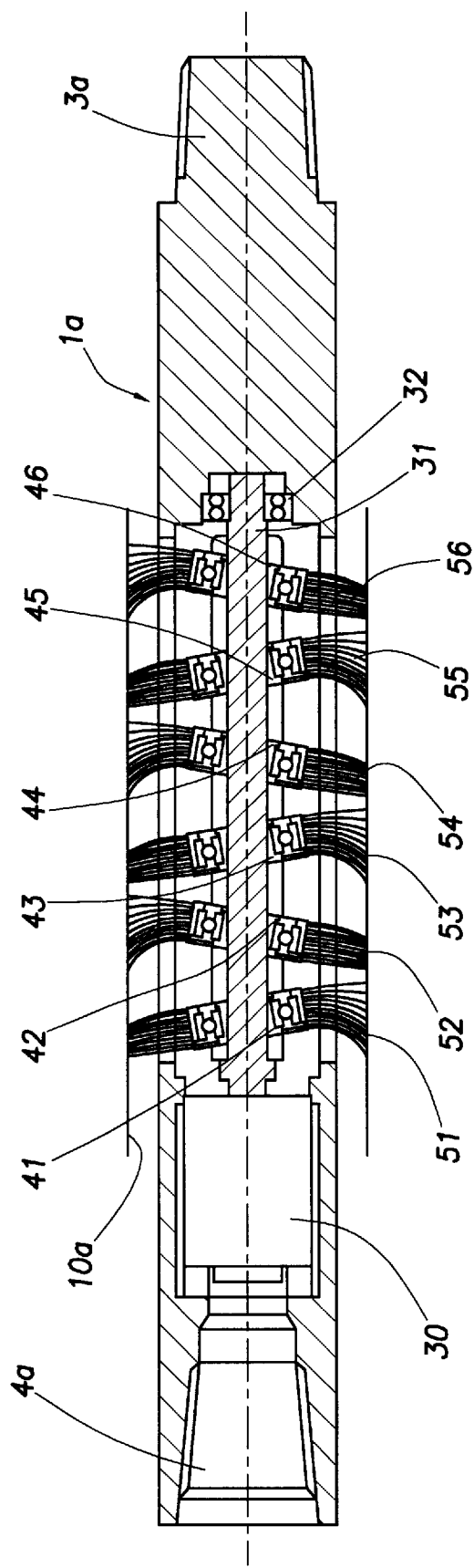
FIG. 3 is a schematic cross sectional view of a further alternative embodiment of the present invention in use.

FIG. 3 shows an alternative embodiment of a down-hole tool 1a including traction apparatus according to the present invention suitable for use on an electric line.

Figure 4A:
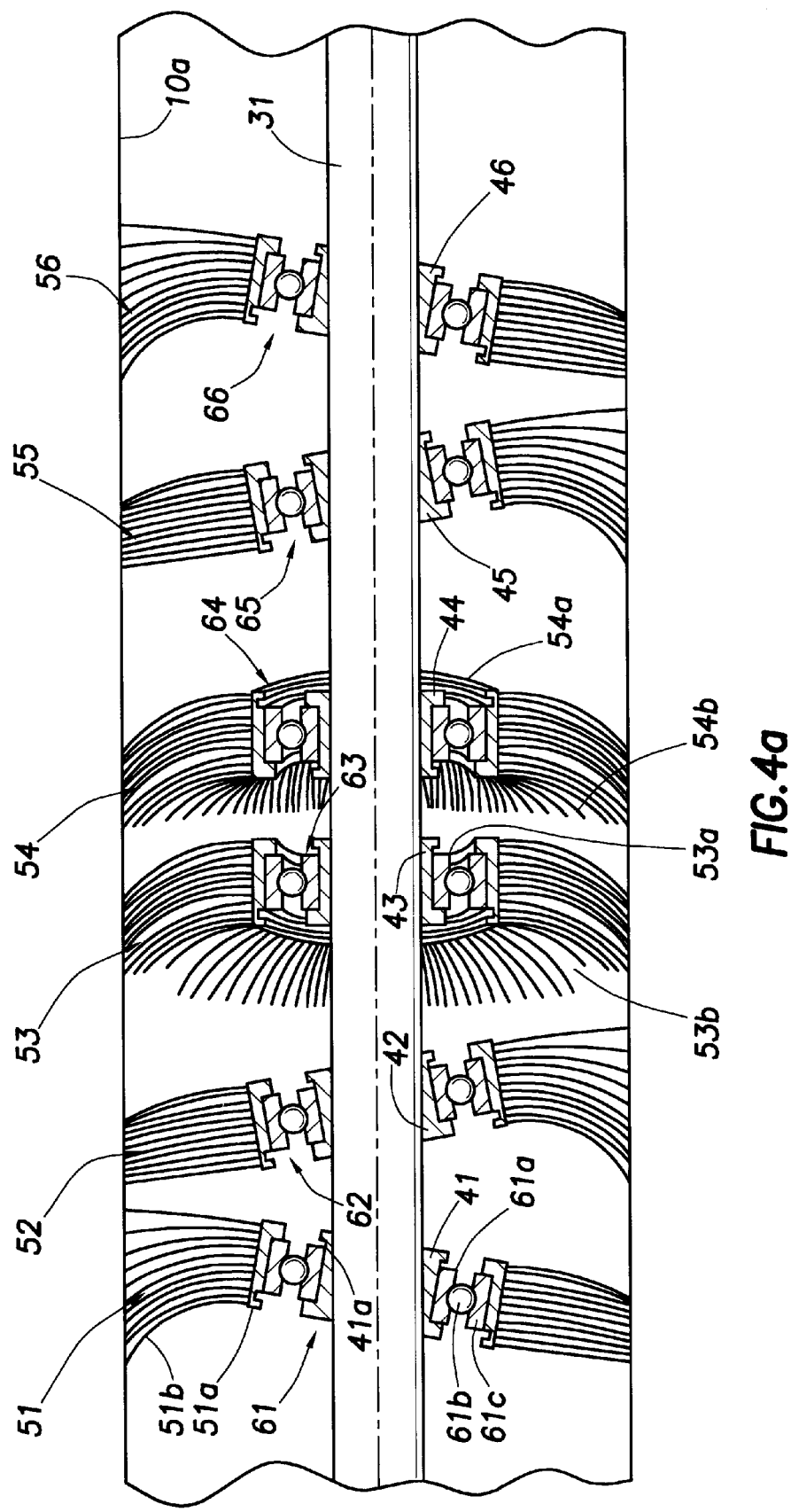
FIG. 4a is a schematic cross sectional view of a detail of the embodiment of FIG. 3 with a variation in configuration.

FIG. 4a schematically shows a detail of a variation of the embodiment of FIG. 3. The embodiment is illustrated as being within a horizontal bore with an inner wall 10a. The down-hole tool 1a has a front end portion 3a and a rear end portion 4a.

The tool 1a includes an electric motor 30 which drives an axle 31 aligned axially along the centre of the tool 1a. The axle 31 extends axially from the motor and is journaled at its end distal from the motor 30 in a bearing 32.

Mounted on the axle 31, between the motor 30 and the bearing 32 are first to sixth collars 41 to 46 which are inclined, at an angle away from the normal, with respect to the axis of rotation of the axle 30. First to sixth annular brush portions 51 to 56 are mounted respectively on the first to sixth collars 41 to 46 via first to sixth annular bearings 61 to 66. For conciseness only one the first of the collar-bearing-brush assemblies will be described in detail, but it will be appreciated that the other assemblies correspond.

The collar 41 is fixed to an annular inner race 61a of the bearing 61 which rotatably supports, via a plurality of rolling members 61b, an annular outer race 61c of the bearing 61. Upon the outer race 61c of the bearing 61 is fixed an annular base part 51a of the brush portion 51, which supports a plurality of bristles 51b of brush portion 51.

When the axle 31 is rotated by the motor 30 the first collar rotates so that its leading edge rotates about the axis of the axle 31. Because it is supported on the bearing 61 the first brush section 51 is not caused to rotate by the rotation of the first collar 61. However, as the collar rotates, the base part 51a of the brush section 51 is moved so that any given point on the base part 51a is moved one cycle backwards and forwards relative to the axle for each rotation of the axle.

The bristles 51b of the first brush section 51 are thus forced forwards and backwards, against the inner wall 10a. The bristles move preferentially in the forward direction and thus provide little reaction force on the tool when moved forward against the inner wall 10a. In contrast, the bristles offer considerably more resistance when forced in the rearwards direction and thus provide considerable reaction force on the tool. Rotation of the axle 31 thus provides a net forward force to propel the tool in the forwards direction.

As illustrated in FIGS. 3 and 4a a number of brush sections 51 to 56 are provided in order to provide greater traction than would be afforded by any one of the brush sections. It is preferable to have the brush sections out of phase in order to distribute the thrust circumferentially around the tool. In FIG. 3 each of the brush sections is shown as being 180 degrees out of phase with the adjacent brush sections, so that, as shown, the uppermost parts of the second, fourth and sixth brush sections 52, 54, 56 and forwardmost and the lowest parts of the first third and fifth brush sections 51, 53, 55 are forwardmost. In FIG. 4a a different phase distribution is illustrated. In particular the forwardmost part of the third brush section 53 is the part which would extend furthest out of the page (not shown), and the forwardmost part of the fourth brush section 54 is the part which extends furthest into the page. Thus in FIG. 4a each of the brush sections 51 to 56 is 180 degrees out of phase with a first one of its neighbours, but each brush section which has two neighbours is also 90 degrees out of phase with the second of its neighbours. Such an arrangement can provide improved stability under traction. It should be noted that in FIG. 4a, because the planes of the third and fourth brush sections 53, 54 are not normal to the page, more of the base parts 53a, 54a and bristles 53b, 54b of the third and fourth brush sections 53, 54 can be seen than of the other brush sections.

Figure 4B:
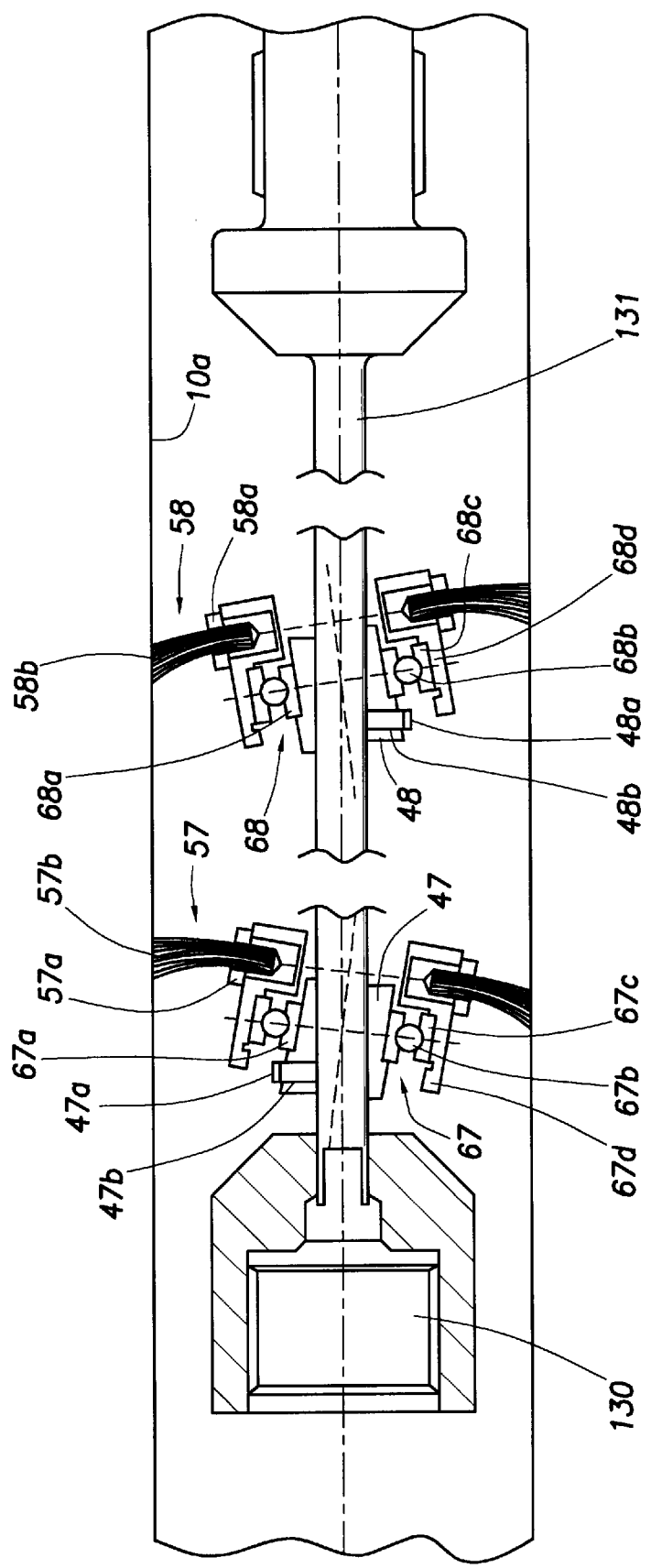
FIG. 4b is a schematic cross sectional view of part of a further variation of the embodiment of FIG. 3.
Figure 4C:
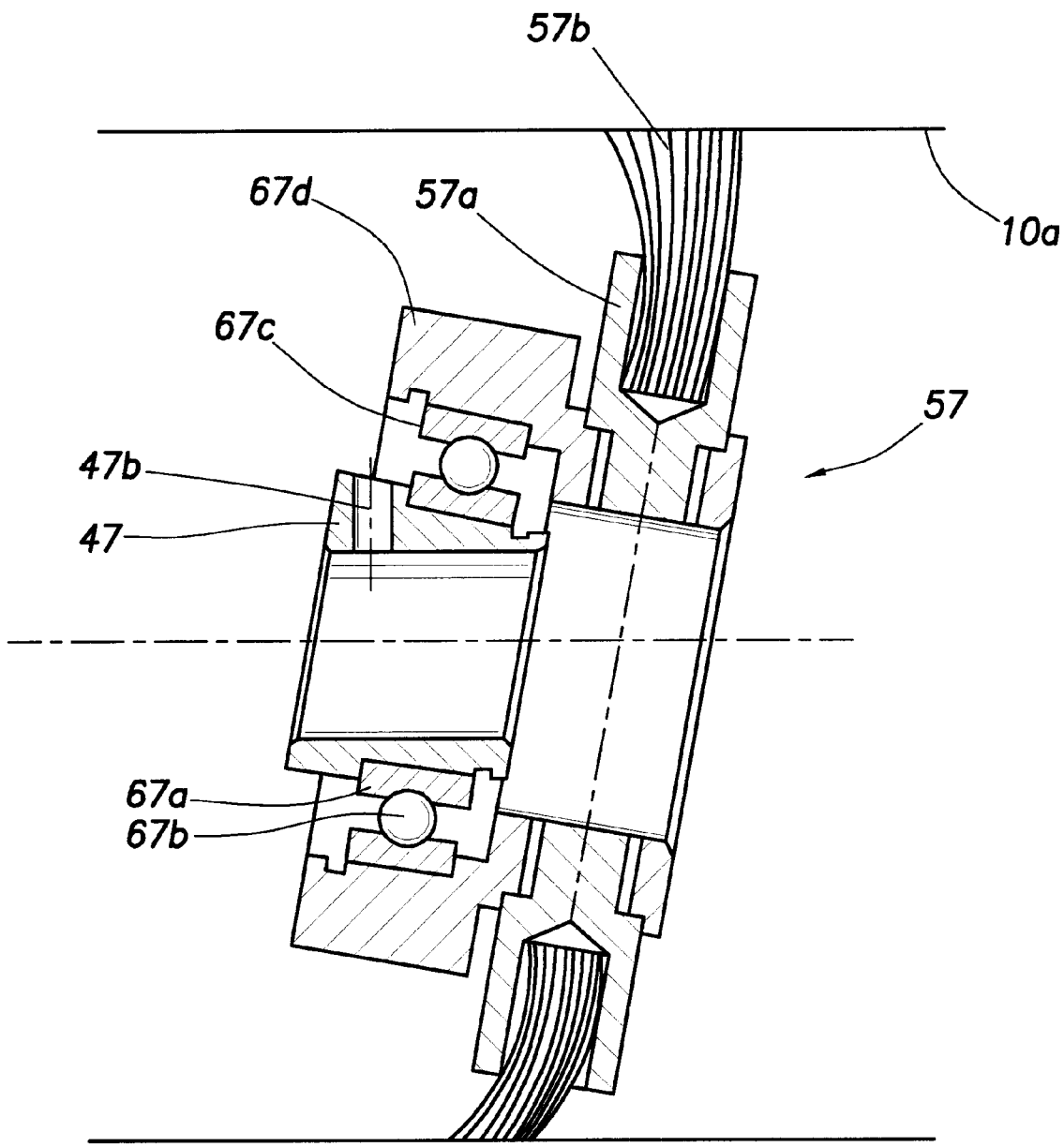
FIG. 4c is a cross sectional view showing a detail of the embodiment of FIG. 4b.

FIG. 4b illustrates a variation of the embodiment of FIG. 3. FIG. 4c shows in detail part of the embodiment of FIG. 4b. As shown in FIG. 4b, first and second brush sections 57, 58 are mounted to an axle 131 which can be rotated by a motor 130.

The brush sections 57, 58 each include a base section 57a, 58a and bristles 57b, 58b for engaging the inner wall 10a.

Mounted to the axle 131 are first and second collars 47, 48 corresponding generally to the collars 41 to 46 of the embodiment of FIG. 3. Attached to the collars 47, 48 are first and second annular bearings 67, 68, corresponding generally to bearings 61 to 66 of the embodiment of FIG. 3 and each including an annular inner race 67a, 68a, rolling members 67b, 68b and an annular outer race 67c, 68c. Attached to the respective outer races 67c, 68c of the bearings 67, 68 are respective annular brush-base holders 67d, 68d, each adapted to receive one or more brush base sections. Thus the brush base sections 57a, 58a are not attached directly to the bearing outer races 67c, 68c but are instead fitted into the brush base holders 67d, 68d facilitating replacement of the brushes 57, 58.

Unlike the collars 41 to 46 of FIGS. 3 and 4a, in the embodiment of FIGS. 4b and 4c the collars 47, 48 are mounted to the axle 131 by fixing pins 47a, 48a which extend through respective holes 47b, 48b which pass through the collars 47, 48 in a direction perpendicular to the axle 131.

The embodiments of FIGS. 3 to 4c thus provide traction apparatus in which traction, and corresponding motion, is provided by moving different traction members (bristles in this embodiment) which are rigidly connected to each other (via the brush base parts) at different velocities in the axial direction, at any given time.

FIGS. 5a, 5b, 6a, 6b, 7a and 7b illustrate the action of a traction device in which axial motion is provided by forcing traction members in a radial direction with respect to a down-hole tool 1b.

A down-hole tool 1b is provided with first to eighth brush sections of which, for clarity in the drawings, the first and second 71, 72 are shown in each of FIGS. 5a to 7b, the third and fourth 73, 74 are shown in FIGS. 5b, 6b and 7b only, the fifth and sixth are shown in FIGS. 5a, 6a and 7a only, and the seventh and eighth are not shown.

Each of the brush sections 71 to 76 is attached to the main body of the down-hole tool 1b by a respective arm member 81 to 86 which is radially extendable away from the main body of the tool 1b.

FIGS. 5a and 5b show the positions of the arm members 81 to 86 and brush sections 71 to 76 in an inactive position in which all of the arms 81 to 86 are in their respective retracted positions and the outermost ends of the brush sections 71 to 76 (that is the outermost ends of the bristles) are in light contact with an inner wall 10b of a horizontal bore.

FIGS. 6a and 6b show the positions of the arm members 81 to 86 and brush sections 71 to 76 at a first stage in a traction cycle. At this time the arms 81 to 84 of the first to fourth brush sections 71 to 74 are fully radially extended, forcing the bristles of the brush sections 71 to 74 against the inner wall 10b. This radial extension causes the brush sections 71 to 74 to push against the inner wall 10b in the backwards direction, which applies a reaction force in the forwards direction (rightwards as shown in FIGS. 5a, 6a, 7a) on the body of the tool 1b. The force will tend to move the body of the tool in the forwards direction. The broken lines in FIGS. 6a to 7a correspond to the positions of the brush sections 71 to 76 in FIGS. 5a and 5b so that the forwards movement can be appreciated. As shown in FIG. 6a, at this point of the traction cycle the fifth and sixth arms 85, 86 and seventh and eighth arms (not shown) remain in their retracted position.

FIGS. 7a and 7b show the positions of the arm members 81 to 86 and brush sections 71 to 76 at a second point in the traction cycle. At this time the fifth and sixth arms 85 and 86 and the sixth and seventh arms (not shown) are fully radially extended forcing the fifth and sixth brush sections 75, 76 and the seventh and eighth brush sections (not shown) against the inner wall 10b. As in the case of the first to fourth brush sections 71 to 74, described above, this applies a force and corresponding movement to the body of the tool 1a in the forwards (rightwards) direction. The first to fourth arms retract as the fifth to eighth arms extend so that, as shown in FIGS. 7a and 7b the first to fourth arms are fully restricted when the fifth to eighth arms are fully extended.

Continuous cycling between the position shown in FIGS. 6a, 6b and the position shown in FIGS. 7a, 7b will provide a continued propulsive force on the body of the tool 1a. Embodiments are envisaged in which traction members may be moved both axially and radially and either the axial or radial movement might predominate.

One of many driving mechanisms may be used to extend and retract the arms 81 to 86. For example, mechanical means such as a rotating shaft with four-lobed cams could be used. Alternatively, a hydraulic system could be employed. As a further alternative an electro-mechanical system could be used. It will also be appreciated that these and other driving mechanisms could be suitable for driving the motion of the traction members in the other embodiments of the invention.

It will be appreciated that in certain embodiments of the present invention the traction members will, in equilibrium (that is when not contacting a traction surface) be substantially perpendicular to the axis of the traction apparatus. In such embodiments it is the constriction of the traction members which effectively sets the preferential direction of motion. In such embodiments it may be possible to reverse the preferential direction of motion by overpulling the tool, ie by providing a sharp or jarring force. In other embodiments it may be more appropriate to reverse the preferential direction by retracting and re-deploying the traction members.

It will be appreciated that although the preferred embodiments described herein are disclosed as including brushes in which the bristles constitute traction members, other types of traction members may be used provided they are able to contact the traction surface and, when in contact, move preferentially in one direction over the other. It is preferred that the traction members are resilient elongate members, such as leaf springs or bristles. In the case of bristles it is preferred that the bristles be encapsulated into a block of resilient material in order to reduce wear.

Figure 8B:
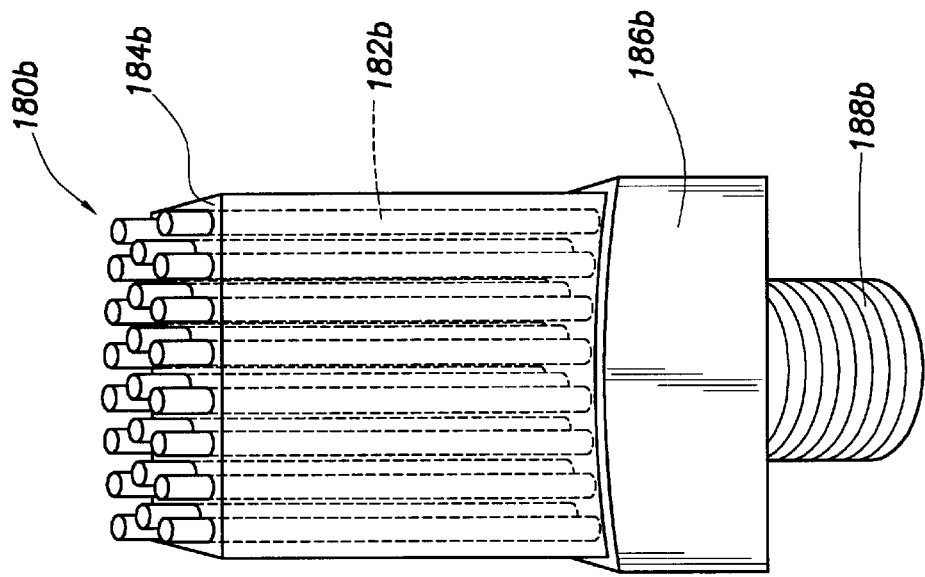
FIGS. 8a and 8b show schematically embodiments of brush sections suitable for use in embodiments of apparatus in accordance with the present invention.
Figure 8A:
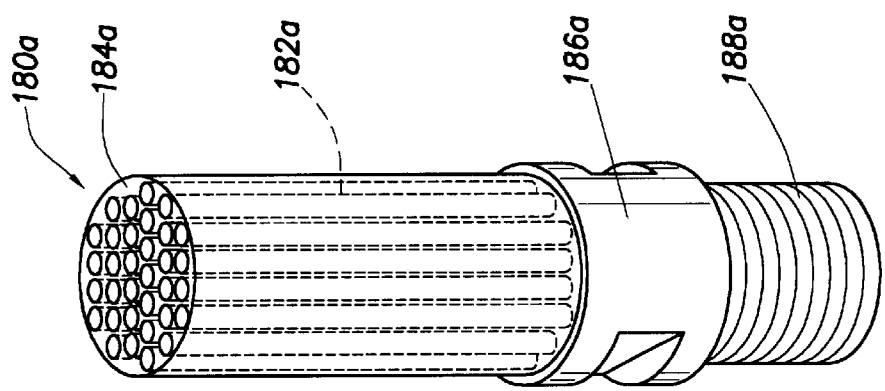

FIGS. 8a and 8b show embodiments of first and second brush sections 180a, 180b, respectively.

FIG. 8a shows a round brush section 180a having a number of bristles 182a encapsulated in a matrix 184a of urethane or other suitably resilient material. The bristles 182a are supported in a brush base section 186a comprising a generally cylindrical metal casing for holding the bristle bases. A threaded connection portion 188a is provided facilitating easy fitting and replacement. Other types of connection could, of course, be used. In this embodiment only the bristle tips are uncovered by the matrix 184a.

FIG. 8b shows a rectangular brush section 180b having a number of bristles 182b encapsulated in a rubber matrix 184b. The bristles 182b are supported in a brush base 186b which consists of a block of foundation material. A connection portion 188b is provided. In this embodiment a predetermined length of the bristles 182b extends from the outer end of the rubber matrix 184b.

The contact of the traction members on the traction surface is important in order to obtain preferential movement in one direction. In preferred embodiments it is desirable that the ends or tips of the traction members engage the traction surface. The length of the traction members is therefore important, since if a traction member is too short it might not reach the traction surface, and if the traction member is too long it might be an axial surface of the traction member, rather than the tip of the traction member, which engages the traction surface. In practice, for many types of traction member, a range of lengths provide an acceptable result. Choice of length may be of particular importance in embodiments such as those of FIGS. 3 to 7b in which the distance between the innermost end of the traction member and the traction surface varies during operation of the apparatus. It is desirable that an effective length of traction member is maintained at all times.

It should be appreciated that the distribution of the traction members may be varied according to the circumstances. It is desirable, but not essential, to have traction members diametrically opposed on the apparatus in order to maintain good stability. Traction members may (or groups of traction members) may be axially or circumferentially spaced as desired. The number and properties of the traction members may also be varied according to the circumstances.

FIGS. 9a and 9b show a pig 90 including bristles 92 encapsulated in a matrix 94. The bristles 92 are set into an annular bristle base 96 made of a foundation material, in an inclined manner. Outer tips 92a of the bristles 92 extend out of the matrix 94 for engaging the inner wall 10a.

In use, the pig 90 can be moved to a desired position, for example on a drill string, by application of continuous fluid or gas pressure on the rearward side (the leftward side as shown in FIG. 9b). When the progress of the pig is impeded such that the continuous pressure is insufficient to move the pig in the desired direction, the pig can be oscillated in order to provide traction because of the preferential motion of the bristle tips 92a against the wall 10a in the forward direction.

Modifications and improvements may be incorporated without departing from the scope of the invention.

What is claimed is:

1. A traction apparatus comprising:
a body from which body extends at least one traction member wherein said at least one traction member is urged against a traction surface against which traction is to be obtained, wherein when said at least one traction member is urged against such a surface it is adapted to move relatively freely in one direction with respect to said surface, but substantially less freely in the opposite direction; and
whereby motion is provided to the at least one traction member by connection to a rotary member having a first axis, which rotates about a second axis which is not coincident with said first axis.

2. A traction apparatus comprising:
a body from which body extends first and second sets of traction members wherein said first and second sets of traction members are adapted to be urged against a traction surface against which traction is to be obtained, and wherein when said first and second sets of traction members are urged against such a surface they are adapted to move relatively freely in one direction with respect to said surface, but substantially less freely in the opposite direction; and
wherein at least some portion of one or more of the first and second traction members is moved with respect to the traction surface by a rotary member having a first axis, which rotates about a second axis which is not coincident with said first axis.

3. A traction apparatus comprising a body incorporating first and second traction members spaced apart along the body for engaging a traction surface at locations spaced apart along the traction surface in the direction in which the apparatus is to be moved, each traction member being urged against the traction surface such that the traction member is movable relatively freely in one direction along the traction surface, but substantially less freely in the opposite direction along the traction surface, and propulsion means for operating the traction members to move the body along the traction surface, the propulsion means acting, in a first phase, to urge a part of the first traction member outwardly against the traction surface whilst said part of the first traction member is being moved relative to the body in said opposite direction in order to impart a propulsion force to the body in said one direction, and the propulsion means acting, in a second phase, which alternates with the first phase, to urge a part of the second traction member outwardly against the traction surface whilst said part of the second traction member is being moved relative to the body in said opposite direction in order to impart a further propulsion force to the body in said one direction, wherein the first and second traction members are mounted on bearing members, portions of which are movable inwardly and outwardly relative to the body by rotation of a common shaft extending through the body.

4. The traction apparatus of claim 3, wherein the propulsion means acts, in the first phase, to decrease the outward pressure applied to said part of the second traction member whilst said part of the second traction member is being moved relative to said body in said one direction, and the propulsion means acts, in the second phase, to decrease the outward pressure applied to said part of the first traction member whilst said part of the first traction member is being moved relative to said body in said one direction.

5. The traction apparatus of claim 3, wherein the traction members comprise resilient material.

6. The traction apparatus of claim 3, wherein the traction members are mounted on the bearing members such that the traction members do not rotate with the bearing members to any substantial extent.

7. The traction apparatus of claim 3, wherein the traction members are mounted on the bearing members such that the traction members are positioned forwardly of the centre lines of the bearing members so that said parts of the first and second traction members are movable towards and away from the traction surface by rotation of the bearing members.

8. The traction apparatus of claim 7, wherein the traction members are mounted on annular portions of the bearing members which extend forwardly of the centre lines of the bearing members.

9. The traction apparatus of claim 3, wherein the bearing members are mounted on a common shaft so as to be rotatable with the shaft.

10. The traction apparatus of claim 3, wherein each of said parts of the first and second traction members is adapted to engage the traction surface in both the first phase and the second phase, the form of the said part being such that, when said part is moved relative to the body in said one direction, said part is movable relatively freely along the traction surface in said one direction, whereas, when said part is moved relative to the body in said opposite direction, said part is movable substantially less freely along the traction surface in said opposite direction with the result that the body is moved along the traction surface.

11. The traction apparatus of claim 3, wherein each of said parts of the first and second traction members is inclined rearwardly relative to the direction of movement where it engages the traction surface.

12. The traction apparatus of claim 3, wherein the propulsion means incorporates an electric or hydraulic motor.

13. The traction apparatus of claim 3, wherein the propulsion means incorporates a hydraulic fluid supply.

14. The traction apparatus of claim 3, wherein the propulsion means incorporates means for oscillating the traction members.

15. The traction apparatus of claim 3, wherein the body is elongate and has a threaded front end and a threaded rear end for attachment in a tool string.

16. The traction apparatus of claim 3, further comprising means for resetting the traction members to reverse the direction of movement of the traction members.

17. The traction apparatus of claim 3, wherein there are provided a plurality of traction members in close proximity to each other, to form a discrete area of traction members.

18. The traction apparatus of claim 17, wherein at least two of the traction members in said discrete area are encapsulated together in a matrix of resilient material.

19. The traction apparatus of claim 18, wherein there are provided a number of spaced apart, discrete areas of traction members.

20. The traction apparatus of claim 19, wherein at least two discrete areas of traction members are movable relative to one another.

21. A traction apparatus comprising a body incorporating first and second traction members spaced apart along the body for engaging a traction surface at locations spaced apart along the traction surface in the direction in which the apparatus is to be moved, each traction member being urged against the traction surface such that the traction member is movable relatively freely in one direction along the traction surface, but substantially less freely in the opposite direction along the traction surface, and propulsion means for operating the traction members to move the body along the traction surface, the propulsion means acting, in a first phase, to urge a part of the first traction member outwardly against the traction surface whilst said part of the first traction member is being moved relative to the body in said opposite direction in order to impart a propulsion force to the body in said one direction, and the propulsion means acting, in a second phase, which alternates with the first phase, to urge a part of the second traction member outwardly against the traction surface whilst said part of the second traction member is being moved relative to the body in said opposite direction in order to impart a further propulsion force to the body in said one direction, wherein the traction members are mounted on rotary bearing members which are inclined relative to their axis of rotation so that said parts of the first and second traction member are movable alternately in said one direction and in said opposite direction by rotation of the bearing members.

22. A traction apparatus comprising a body having first and second traction members spaced along the body for engaging a traction surface at locations spaced apart along the traction surface in the direction in which the apparatus is to be moved, each traction member being adapted to engage the traction surface such that the traction member is movable relatively freely in one direction along the traction surface, but substantially less freely in the opposite direction along the traction surface, and propulsion means for operating the traction members to move the body along the traction surface, the propulsion means acting, in a first phase, to bias the first traction member against the traction surface while the second traction member is maintained in a substantially released state, and the propulsion means acting, in a second phase, which alternates with the first phase, to bias the second traction member against the traction surface while the first traction member is maintained in a substantially released state, the traction members being mounted on displacement members which are displaceable radially outwardly and inwardly to move the traction members towards and away from the traction surface, the biasing of the traction members resulting in deflection of the traction members in such a manner as to increase the resistance to movement in said opposite direction so that movement of the body in said one direction is effected by such deflection.

23. The traction apparatus according to claim 22, wherein the traction members comprise resilient material.

24. The traction apparatus according to claim 22, wherein the displacement members are arms which extend radially outwardly from the body.

25. The traction apparatus according to claim 22, wherein the displacement members are adapted to be moved by cams on rotation of a common drive shaft.

26. The traction apparatus according to claim 22, wherein the propulsion means incorporates an electric or hydraulic motor.

27. The traction apparatus according to claim 22, wherein the propulsion means incorporates a hydraulic fluid supply.

28. The traction apparatus according to claim 22, wherein the propulsion means incorporates means for oscillating the traction members.

29. The traction apparatus according to claim 22, wherein the body is elongate and has a threaded front end and a threaded rear end for attachment in a tool string.

30. The traction apparatus according to claim 22, further comprising means for resetting the traction members to reverse the direction of movement of the traction members.

31. The traction apparatus according to claim 22, wherein there are provided a plurality of traction members in close proximity to each other, to form a discrete area of traction members.

32. The traction apparatus according to claim 31, wherein at least two of the traction members in said discrete area are encapsulated together in a matrix of resilient material.

33. The traction apparatus according to claim 22, wherein there are provided a number of spaced apart, discrete areas of traction members.

34. The traction apparatus according to claim 33, wherein at least two discrete areas of traction members are movable relative to one another.

\* \* \* \* \*

UNITED STATES PATENT AND TRADEMARK OFFICE
CERTIFICATE OF CORRECTION

PATENT NO. : 6,460,616 B1 Page 1 of 1
DATED : October 8, 2002
INVENTOR(S) : Neil Andrew Abercrombie Simpson It is certified that error appears in the above-identified patent and that said Letters Patent is hereby corrected as shown below:

<u>Title page,</u>
Item [57], ABSTRACT, please change "member (51) when engages" to -- member (51) which engages --.

Signed and Sealed this

Eighteenth Day of February, 2003

JAMES E. ROGAN
*Director of the United States Patent and Trademark Office*